(12) United States Patent
Williams et al.

(10) Patent No.: US 8,862,672 B2
(45) Date of Patent: Oct. 14, 2014

(54) CONTENT SHARING AND INSTANT MESSAGING

(75) Inventors: K. Aaron Williams, Woodinville, WA (US); John R. Selbie, Kirkland, WA (US); James A. Canitz, Bothell, WA (US); Kandarp D. Jani, Seattle, WA (US); Steven K. Abrahams, Seattle, WA (US); Troy A. Schauls, Seattle, WA (US); Asta J. Roseway, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1390 days.

(21) Appl. No.: 12/198,000

(22) Filed: Aug. 25, 2008

(65) Prior Publication Data

US 2010/0050092 A1   Feb. 25, 2010

(51) Int. Cl.
| | | |
|---|---|---|
| G06F 15/16 | (2006.01) | |
| G06F 3/0481 | (2013.01) | |
| H04N 21/4788 | (2011.01) | |
| G06Q 10/10 | (2012.01) | |

(52) U.S. Cl.
CPC .......... *G06F 3/0481* (2013.01); *H04N 21/4788* (2013.01); *G06Q 10/101* (2013.01)
USPC .......................................... 709/206; 709/205

(58) Field of Classification Search
CPC .................. G06Q 10/101; H04N 21/4788
USPC .................................................. 709/206, 205
See application file for complete search history.

(56) References Cited

U.S. PATENT DOCUMENTS

| | | | |
|---|---|---|---|
| 7,200,590 B2 | 4/2007 | Everett-Church et al. | |
| 7,353,252 B1* | 4/2008 | Yang et al. | 709/204 |
| 7,487,455 B2 | 2/2009 | Szeto | |
| 8,281,248 B2* | 10/2012 | Kurpick et al. | 715/753 |
| 2003/0037111 A1* | 2/2003 | Yoshioka | 709/205 |
| 2003/0182375 A1* | 9/2003 | Zhu et al. | 709/205 |
| 2005/0004995 A1 | 1/2005 | Stochosky | |
| 2005/0021624 A1* | 1/2005 | Herf et al. | 709/204 |
| 2005/0132288 A1 | 6/2005 | Kirn et al. | |
| 2005/0193062 A1* | 9/2005 | Komine et al. | 709/204 |
| 2006/0294189 A1 | 12/2006 | Natarajan et al. | |
| 2007/0005694 A1 | 1/2007 | Popkin et al. | |

(Continued)

FOREIGN PATENT DOCUMENTS

CN          1705928          12/2005

OTHER PUBLICATIONS

"Communicate, Collaborate, Share—17 Reasons Why You Should Use Qnext for Instant Messaging", Retrieved from: <http://webtips.blogsome.com/2009/06/12/qnext-multi-utility-communication-collaborative-sharing-tool/> on May 18, 2010, (Jun. 12, 2009),3 pages.

(Continued)

*Primary Examiner* — Hieu Hoang
(74) *Attorney, Agent, or Firm* — Tom Wong; Jim Ross; Micky Minhas

(57) ABSTRACT

Content sharing and instant messaging are described. In an implementation, a first user interface is displayed at a first client that is configured to provide instant messaging with a second client having a second user interface. One or more content items are output in the first user interface to be controllable via both the first user interface and the second user interface.

12 Claims, 8 Drawing Sheets

(56) References Cited

U.S. PATENT DOCUMENTS

| | | | |
|---|---|---|---|
| 2007/0168863 A1 | 7/2007 | Blattner et al. | |
| 2007/0203984 A2 | 8/2007 | AlHusseini et al. | |
| 2007/0250571 A1* | 10/2007 | Griffin, Jr. | 709/204 |
| 2008/0052637 A1 | 2/2008 | Ben-Yoseph et al. | |
| 2008/0065782 A1* | 3/2008 | Jones | 709/240 |
| 2008/0091778 A1* | 4/2008 | Ivashin et al. | 709/204 |
| 2008/0155129 A1* | 6/2008 | Khedouri et al. | 710/8 |
| 2008/0229202 A1* | 9/2008 | Fang et al. | 715/716 |
| 2008/0317439 A1* | 12/2008 | Wong et al. | 386/124 |
| 2009/0070673 A1* | 3/2009 | Barkan et al. | 715/716 |
| 2009/0138808 A1* | 5/2009 | Moromisato et al. | 715/758 |
| 2009/0327448 A1 | 12/2009 | Williams et al. | |

OTHER PUBLICATIONS

Esenther, Alan W., "Instant Co-Browsing: Lightweight Real-Time Collaborative Web Browsing", TR2002-019, Available at <http://www.merl.com/papers/docs/TR2002-019.pdf>,(May 8, 2001),11 pages.

Hemmeryckx-Deleersnijder, et al., "Awareness and Conversational Context-Sharing to Enrich TV-Based Communication", *ACM Computers in Entertainment*, vol. 6, No. 1, Article 7, Available at <http://delivery.acm.org/10.1145/1360000/1350850/a7-hemmeryckx-dellersnijder.pdf?key1=1350850&key2=6802714721&coll=GUIDE&dl=GUIDE&CFID=90728820&CFTOKEN=32859435>,(2008),pp. 1-13.

Shamma, David A., et al., "Enhancing Online Personal Connections through the Synchronized Sharing of Online Video", *In Proceedings of CHI 2008—Works in Progress*, Available at <http://research.yahoo.com/files/p2931-shamma.pdf>,(Apr. 2008),pp. 2931-2936.

"PCT Search Report and Written Opinion", Application No. PCT/US2009/051626, (Jan. 27, 2010),12 pages.

"Foreign Office Action", Chinese Application No. 200980133796.5, (Feb. 2, 2012),6 pages.

"Foreign Office Action", Chinese Application No. 200980133796.5, (Aug. 20, 2012),9 pages.

* cited by examiner

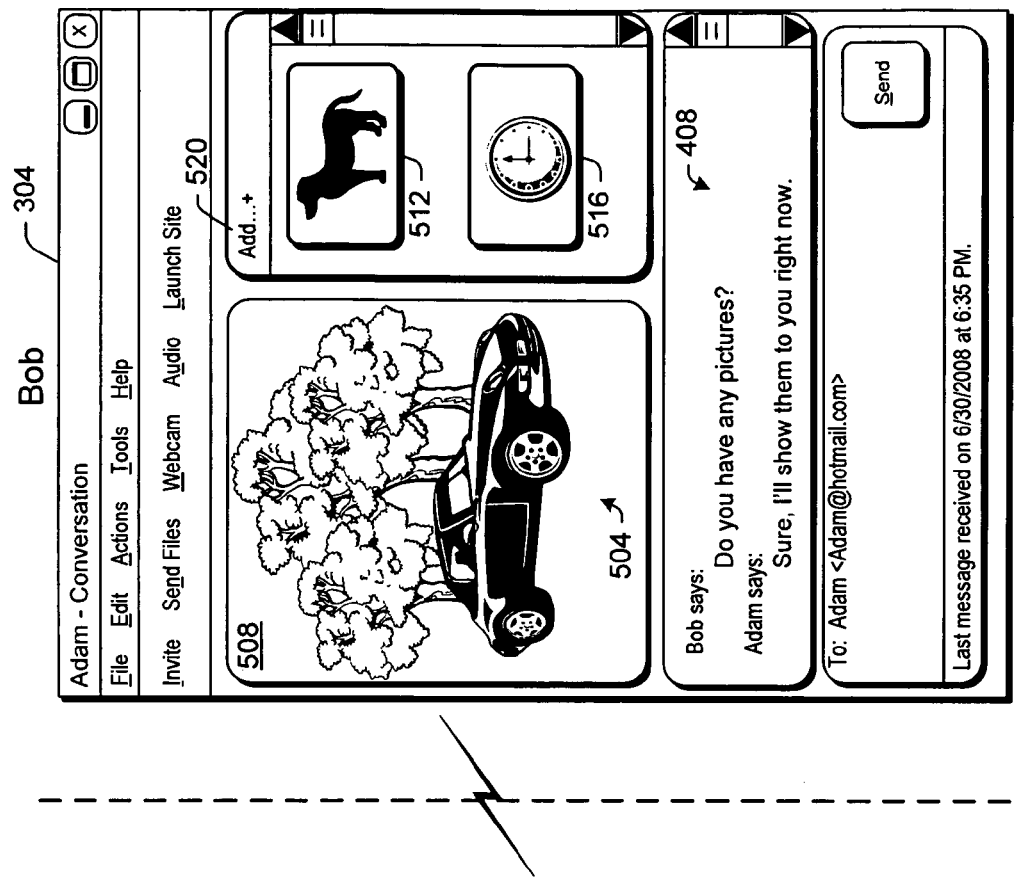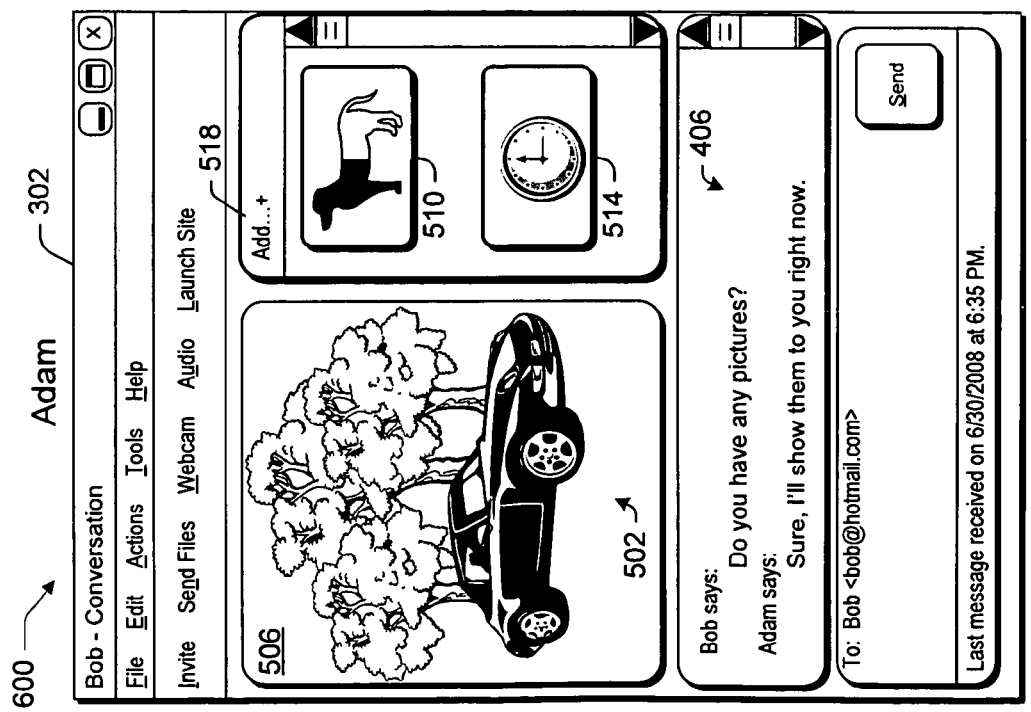
Fig. 6

CONTENT SHARING AND INSTANT MESSAGING

BACKGROUND

Instant messaging is a popular communication tool that enables two or more users to exchange messages via a network during an instant-messaging session. When two users are online at the same time, for instance, instant messages may be exchanged in real time between the two users. Thus, the instant messages may be utilized to support a text conversation between the two users in a manner that mimics how the two users would participate in a typical spoken conversation. However, traditional techniques that were provided to output content in conjunction with an instant-messaging session were disconnected and disjointed, thereby decreasing overall satisfaction of the two users with the instant-messaging session.

SUMMARY

Content sharing and instant messaging are described. In an implementation, a first user interface is displayed at a first client that is configured to provide instant messaging with a second client having a second user interface. One or more content items are output in the first user interface to be controllable via both the first user interface and the second user interface.

In an implementation, one or more content items are displayed in a first user interface to be controllable via both the first user interface and a second user interface. The first and second user interfaces are configured to provide instant messaging, one with another. Status is displayed of a file transfer of another content item from the second client to the first client in the first user interface using a representation of the other content item.

In an implementation, one or more content items are displayed in a first user interface that is configured to provide instant messaging with a second user interface. The first user interface has a content-sharing portion to display the one or more content items and a conversation portion to display the instant messaging. An option is displayed that is selectable to cause an increase in an amount of display area consumed by the conversation portion and a decrease in an amount of display area consumed by the content-sharing portion, the content-sharing portion and the conversation portion being concurrently displayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 6 is an illustration of an example system showing the first and second user interfaces of FIG. 5 in which a representation of a content item is output that indicates a status of a transfer of the respective content item from the second client to the first client.

DETAILED DESCRIPTION

Example Environment

Figure 1:
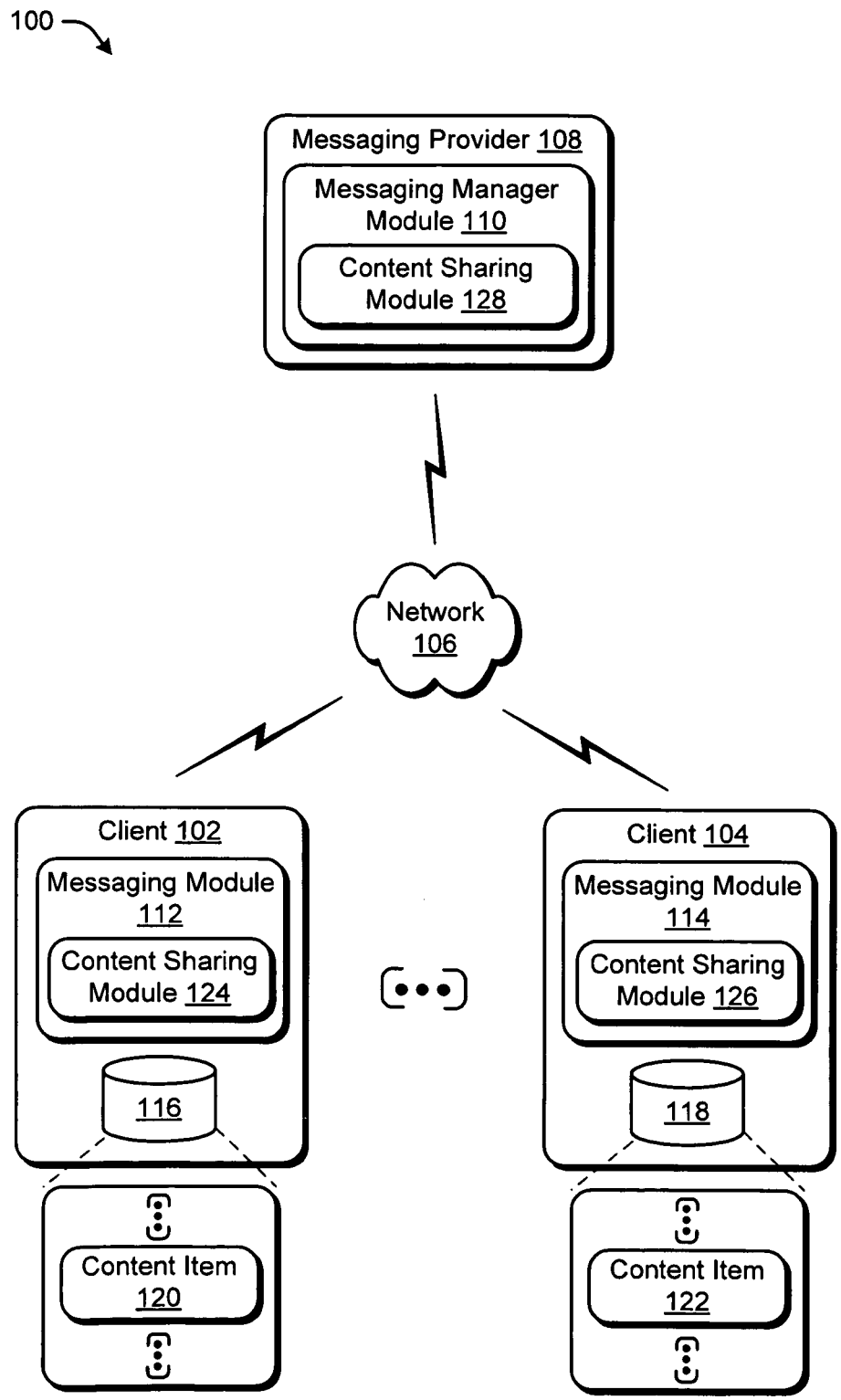
FIG. 1 is an illustration of an environment in an example implementation that is operable to perform content sharing and instant messaging.

FIG. 1 is an illustration of an environment 100 in an example implementation which is operable to implement content sharing and instant messaging. The environment includes first and second clients that are illustrated as client 102 and client 104. Accordingly, reference may be made to the clients in multiple ways in the following discussion, e.g., client 102, first client 102, and so on. Additionally, although two clients 102, 104 are shown, it should be readily apparent that the environment may employ additional clients without departing from the spirit and scope thereof.

The clients 102, 104 are illustrated as being communicatively coupled via a network 106. Accordingly, the clients 102, 104 may be configured in a variety of ways for accessing the network 106. For example, one or more of the clients 102, 104 may be configured as a computing device, such as a desktop computer, a mobile station, an entertainment appliance, a set-top box communicatively coupled to a display device, a wireless phone, a game console, and so forth. Thus, the clients 102, 104 may range from full resource devices with substantial memory and processor resources (e.g., personal computers, game consoles) to low-resource devices with limited memory and/or processing resources (e.g., traditional set-top boxes, hand-held game consoles). The clients 102, 104 may also relate to a person and/or entity that operate the clients. In other words, one or more of the clients 102, 104 may describe logical clients that include users, software (e.g., executable modules), and/or devices (e.g., a device with a processor and memory configured to execute instructions).

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks. For instance, client 102 may be communicatively coupled via a peer-to-peer network with client 104 to perform instant messaging. In another instance, each of the clients 102, 104 may also be communicatively coupled to the messaging provider 108 (having a messaging manager module 110) over the Internet to communicate instant messages. A variety of other instances are also contemplated.

Each of the plurality of clients 102, 104 is illustrated as including a respective one of a plurality of messaging modules 112, 114. Each of the messaging module 112, 114 is executable such that a respective client 102, 104 may participate in an instant-messaging session with another one of the clients 102, 104.

Instant messaging provides a mechanism such that each of the clients 102, 104, when participating in an instant-messaging session, may send text messages to each other. The instant messages are typically communicated in real time, although delayed delivery may also be utilized, such as by logging the text messages when one of the clients 102, 104 is unavailable, e.g., offline. Thus, instant messaging may be thought of as a combination of email and Internet chat in that instant messaging supports message exchange and is designed for two-way "live" chats. Therefore, instant messaging may be utilized for synchronous communication. For instance, like a voice telephone call, an instant-messaging session may be performed in real-time such that each client 102, 104 may respond to each other user as the instant messages are received.

In an implementation, the messaging modules 112, 114 communicate with each other through use of a messaging provider 108. Messaging provider 108, for instance, may include a messaging manager module 110 that is representative of functionality to route instant messages between the messaging modules 112, 114. For example, client 102 may cause the messaging module 112 to form an instant message for communication to client 104. The messaging module 112 is executed to communicate the instant message to the messaging provider 108, which then executes the messaging manager module 110 to route the instant message to the client 104 over the network 106. The client 104 receives the instant message and executes the messaging module 114 to display the instant message in a user interface.

In another implementation, when the clients 102, 104 are communicatively coupled directly, one to another (e.g., via a peer-to-peer network), the instant messages are communicated without utilizing the messaging provider 108. A variety of other examples are also contemplated, such as multiple messaging providers 108.

Each of the plurality of clients 102, 104 may have access to a wide variety of content in the environment 100 of FIG. 1. For example, third-party services (e.g., a website) may provide content to the clients 102, 104. Likewise, each of the clients 102, 104 may include respective storage 116, 118 (e.g., memory or other computer-readable media) for one or more respective content items 120, 122.

To share this content, the clients 102, 104 are illustrated as including respective content-sharing modules 124, 126. The content-sharing modules 124, 126 are representative of functionality to share content items within a context of an instant-messaging session. In an implementation, this sharing is performed such that the content items 120, 122 may be shared electronically in a manner similar to a "coffee table" discussion. For instance, the sharing may be performed such that first and second user interfaces output respectively by the first and second content-sharing modules 124, 126 match, e.g., each party views the same content items at the same time and in the same order.

Additionally, in an implementation the content items are controllable by both the first and second user interfaces. Traditionally, control of a display of content items, whether output in a single user interface or multiple user interfaces, was limited to a single entity, such as a "leader" of an online meeting. Although leadership could be passed in some traditional instances by communication of a token, the control of the content was still limited to a single entity at any one time.

In an implementation, control of the content items 120, 122 in the user interfaces is possible via both the first user interface and the second user interface at any one time. Therefore, the clients 102, 104 may control content 120, 122 freely in the user interfaces without passing a token. Further discussion of content sharing may be found in relation to the following procedures.

Synchronous List of Ordered Media Sources

In an implementation, each of the clients 102, 104 may add additional media sources to an existing session at any time. The content-sharing modules 124, 126 may keep each source in synchronous order on each display involved in the content-sharing session. This benefits user interaction by enabling use of common language phrases, such as "What is the next photo about?".

Real Time Transfer Queue Prioritization

During file transfer of multiple media sources a receiver can change the download order of his media with a single mouse click. Once selected that media source will be moved to the top of the transfer queue on the Host side to be transferred as the next media source.

Concurrency Handling.

Either party can change the media source and potentially both can change the source at the same time. In an implementation, the content-sharing modules 124, 126 converge the source on a most-recently selected (e.g., last) source.

For example, when either client selects a media source in the UI a system message ("a media source change request") is sent to the other client which includes an incremented sequence number, an ack value, and the identification number of the media source. For purposes of the following discussion, the client that initiated the content-sharing session is referred to as the "host" and the other client (or clients) that are to receive the content item is referred to as the "receiver".

When a media source is selected by either client, a local acknowledgement (e.g., "ack") value is updated from a sequence number in a media source change request previously received. When the receiver receives this message from the host, the receiver will update the user interface to display the media source referenced by the identification number in the system message.

When the host receives a system message from the receiver, the host compares the acknowledgement value from the system message against the receiver's own sequence number.

When the number is less than the receiver's local sequence number, the receiver notifies the host that this message was sent before the last message received, which indicates it is out of sequence. The message is then ignored.

When the received acknowledgment value is greater than the local sequence number, the message is considered a valid request and the host user interface is updated with the media source identified. A variety of other concurrency handling techniques are also contemplated without departing from the spirit and scope thereof.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as memory. The features of the instant messaging techniques described below are platform-independent, meaning that the instant messaging techniques may be implemented on a variety of commercial computing platforms having a variety of processors.

Example Procedures

The following discussion describes content sharing and instant messaging that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 2:
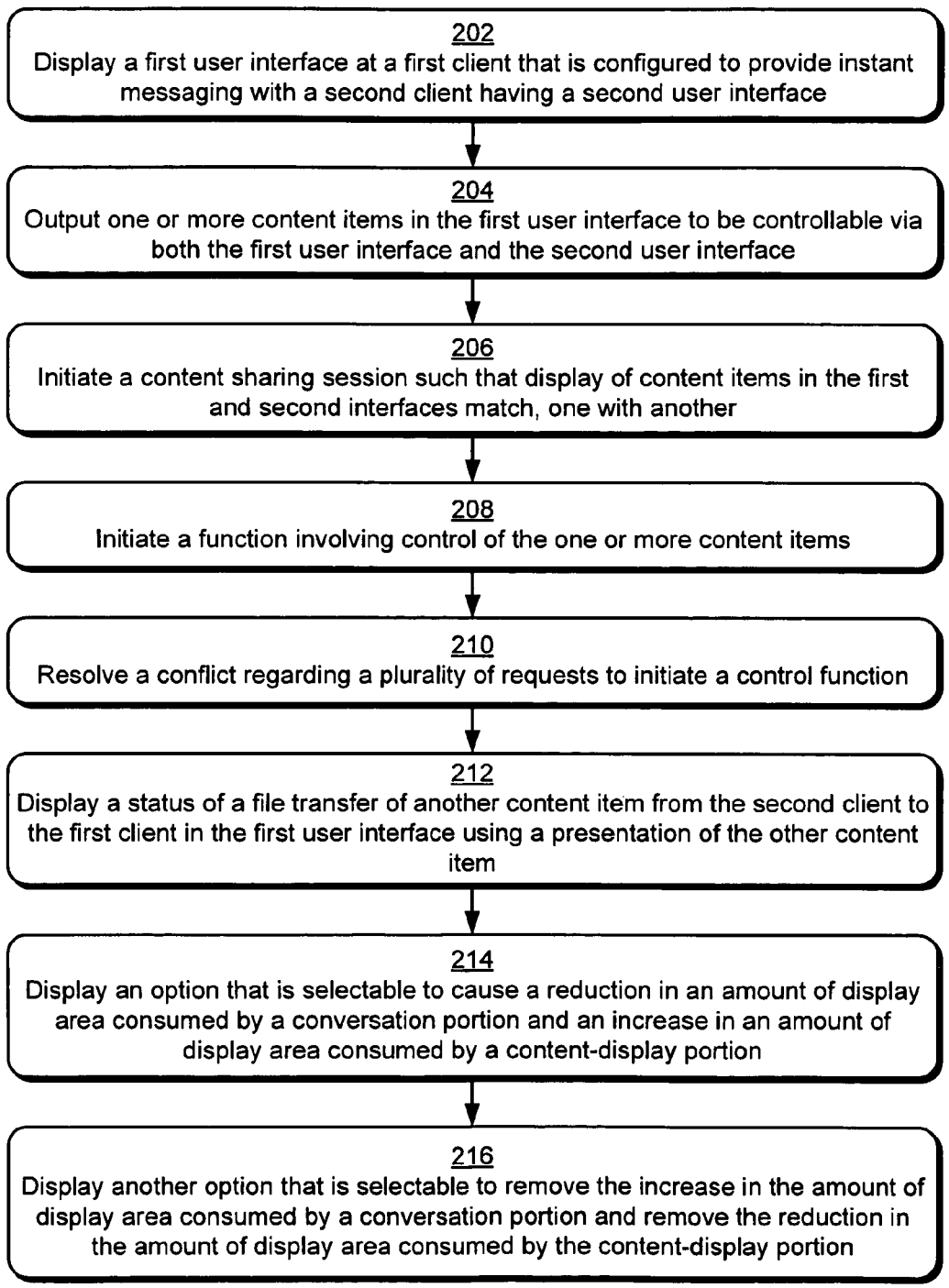
FIG. 2 is a flow diagram depicting a procedure in an example implementation in which a display of content is shared simultaneously in two user interfaces that are configured to perform instant messaging.

FIG. 2 is a flow diagram depicting a procedure 200 in an example implementation in which content sharing and instant messaging techniques are described. During the discussion of FIG. 2, reference will also be made to the illustrations of FIGS. 3-8 that include example clients 102, 104 of FIG. 1 and user interfaces. It should be readily apparent that implementation of the procedures is not limited to the example environment 100 of FIG. 1 or user interfaces and systems of FIGS. 3-8. Likewise, the example environment 100 of FIG. 1 and user interfaces are not limited to performing the following procedures.

Figure 3:
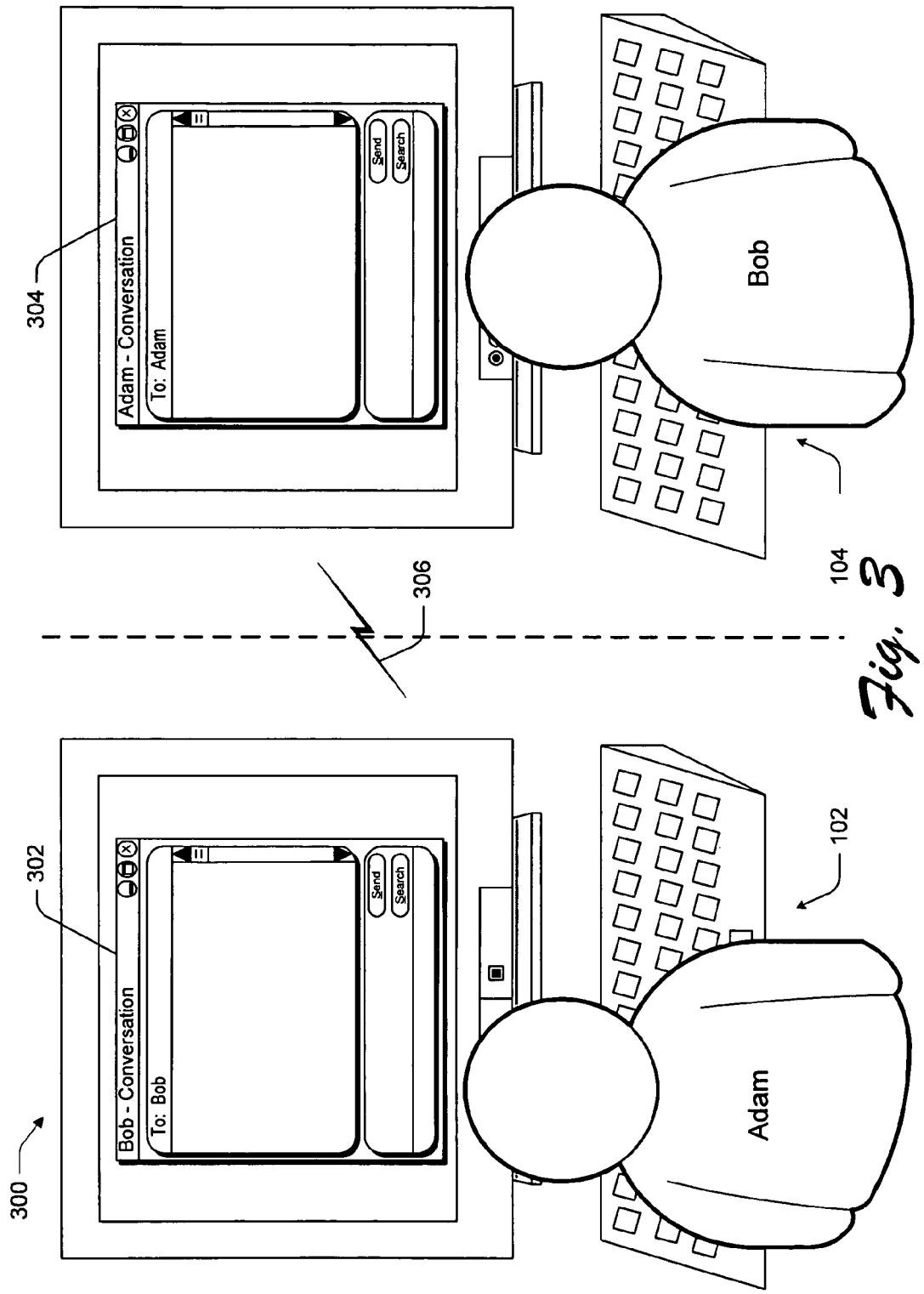
FIG. 3 is an illustration of an example system showing first and second clients that are to communicate via instant messaging.

A first user interface is displayed at a first client that is configured to provide instant message with a second client having a second user interface (block 202). FIG. 3 is an illustration 300 in an example implementation showing user interfaces that are output in relation to an instant-messaging session between the first and second clients 102, 104 of FIG. 2 during an instant-messaging session. A first client 104(1) (illustrated as "Adam") and a second client 104 (illustrated as "Bob") are engaged in an instant-messaging session. Text associated with instant-messaging session is rendered for viewing in respective user interfaces 302, 304 output by the respective clients 102, 104.

The text messages that are exchanged are transmitted between the clients 102, 104 via a peer-to-peer network connection 306, although other network connections are also contemplated as previously described in relation to the network 106 of FIG. 1. Although FIG. 3 is illustrated and described in relation to a plurality having two clients 102, 104 as participating in an instant-messaging session, it should be recognized that the techniques described herein may also be applied to scenarios in which three or more clients participate in an instant-messaging session.

Figure 4:
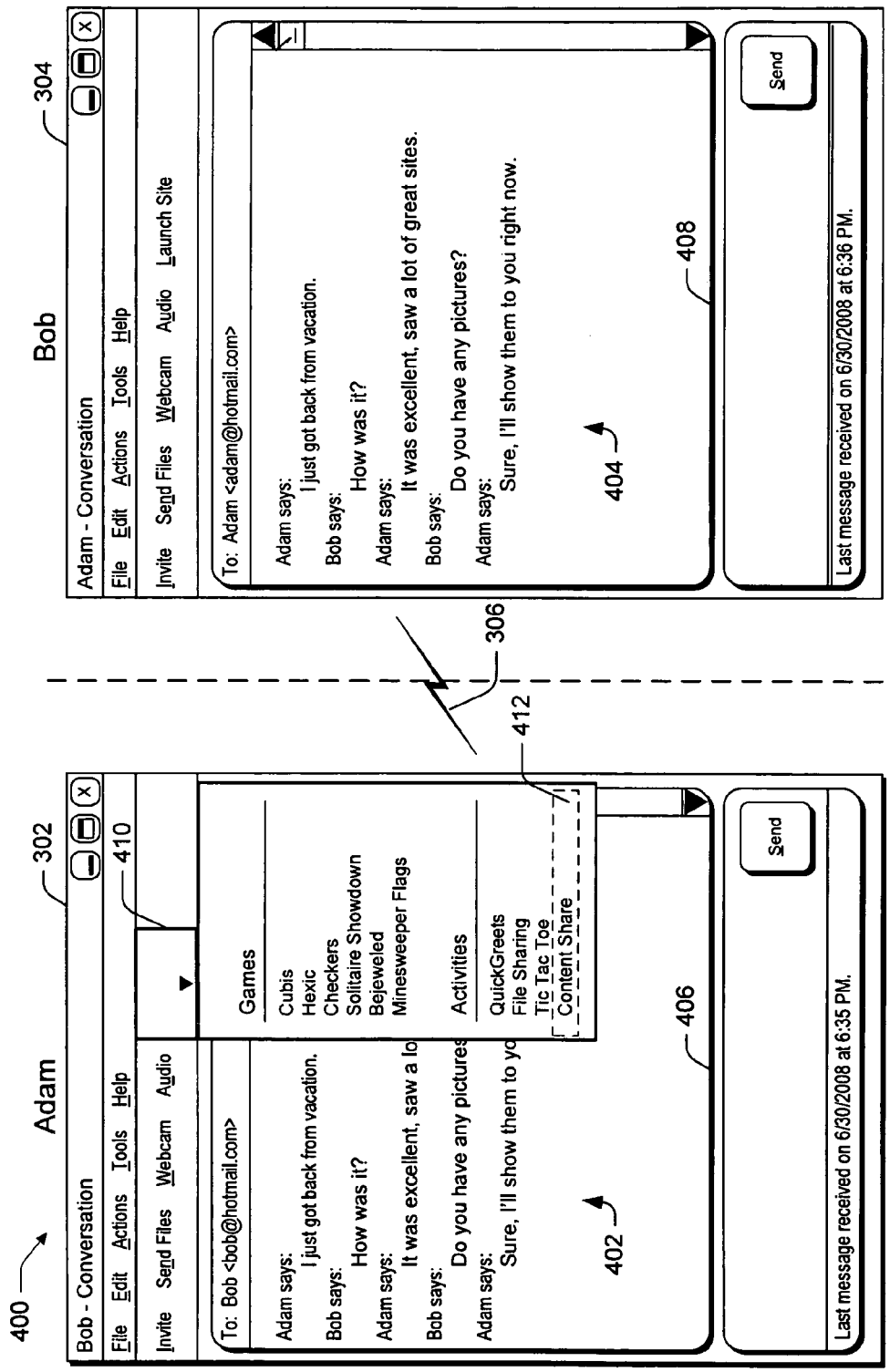
FIG. 4 is an illustration of an example system showing first and second user interfaces that are configured to communicate via instant messaging and initiate a content-sharing session.

Reference will now be made again to FIG. 2, in which, one or more content items are output in the first user interface to be controllable via both the first user interface and the second user interface (block 204). For example, FIG. 4 depicts a system 400 showing the user interfaces 302, 304 of FIG. 3 in greater detail. The user interfaces include respective text 402, 404 that match in respective conversation portions 404, 408.

The text 402, 404 describes a conversation performed during an instant-messaging session in which Adam and Bob discuss a vacation taken by Adam. In the conversation, Adam offers to show Bob pictures taken during the vacation. Accordingly, Adam initiates a content-sharing session through a drop-down menu 410 included in a toolbar of the user interface 302. The drop-down menu 410 includes a portion 412 that is selectable to initiate a content-sharing session. Although a drop-down menu 410 is shown, a variety of other techniques may also be employed to initiate the instant-messaging session, such as a key combination and so on.

Figure 5:
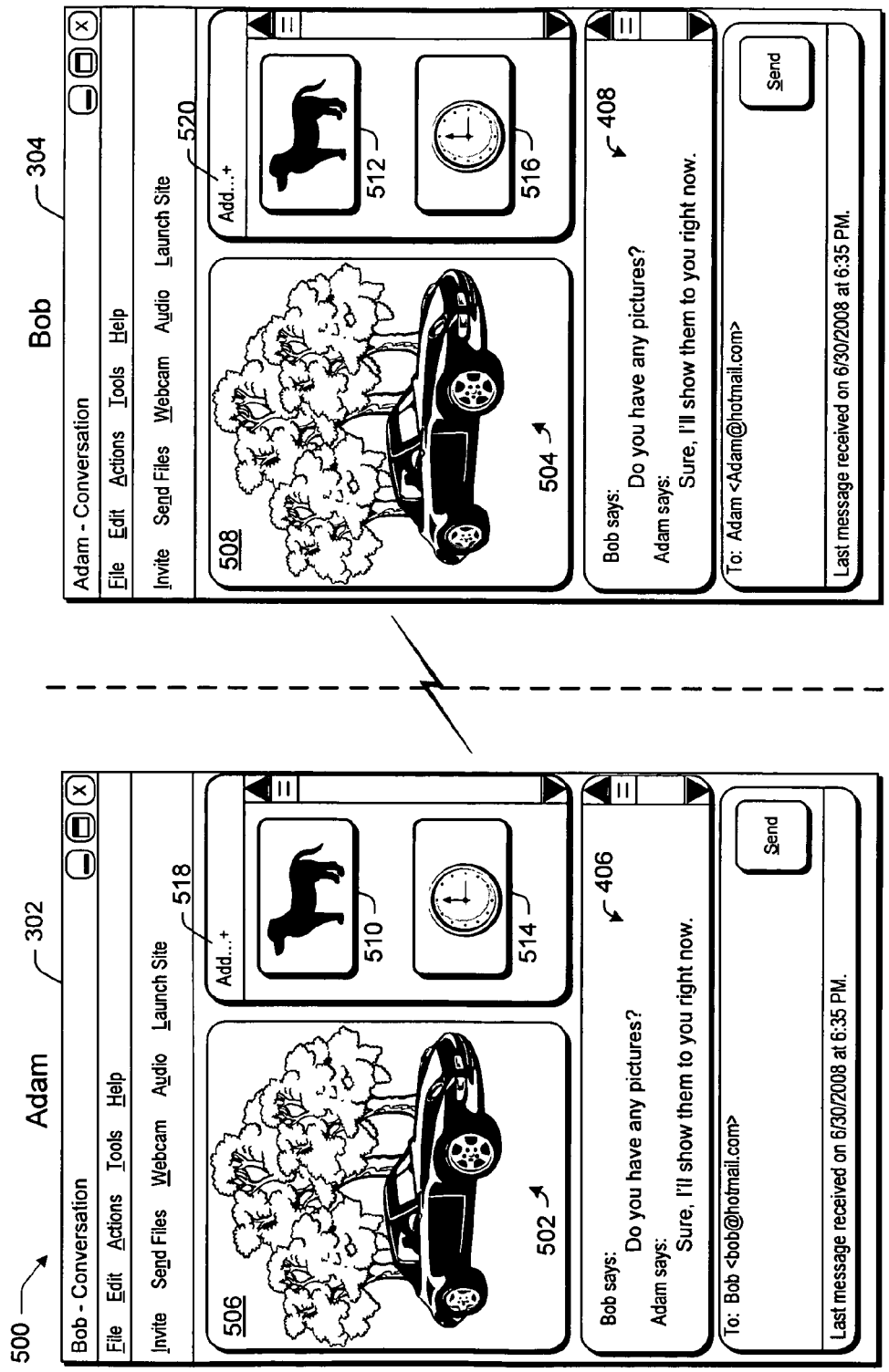
FIG. 5 is an illustration of an example system showing the first and second user interfaces of FIG. 4 as outputting respective content-sharing areas output in response to selection of an option in FIG. 4 to initiate a content-sharing session and respective conversation areas.

A content-sharing session is initiated such that a display of content items in the first and second interfaces matches, one with another (block 206). FIG. 5 depicts a system 500 in an example implementation in which a content-sharing session is initiated within a context of an instant-messaging session.

The user interfaces 302, 304 include the conversation portions 406, 408 of FIG. 4, but in this instance are reduced in size, e.g., consume a lesser amount of display area. The user interfaces 302, 304 are also illustrated as including content-sharing portions 502, 504 that are configured to share content items. For example, the content-sharing portions 502, 504 of the user interfaces 302, 304 are illustrated as including a photo of a car 506, 508 and thumbnail representations of photos of a dog 510, 512 and a clock 514, 516. The display of the content items 502-516 is synchronized between the user interfaces 302, 304 such that each client 102, 104 views a matching output of the content items 502-516. For example, the display of the content items 502-516 may be arranged in a matching order, sized similarly with respect to a corresponding display device, and so on.

Returning back to FIG. 2, a function is initiated involved control of the one or more content items (block 208). In an implementation, display of content items 502-516 in the user interfaces 302, 304 of FIG. 5 is controllable by both the first and second clients 102, 104. For example, client 104 may select the thumbnail representation of dog 512 content item to be displayed, e.g., to replace the display of the car 504 content item. This selection may cause the dog 512 to be displayed in the user interface 304 of client 104, as well as the dog 510 to be displayed in the user interface 302 of client 102.

A variety of other control functions are also contemplated, such as to cancel display of a particular content item, resize a display of a content item, make a change (e.g., color, crop, visual and/or audio effect) to a content item, and so on. The user interfaces 302, 304 is also illustrated as including respective portions 518, 520 that are selectable to add additional content items to the content-sharing portions 502, 504. Although photos have been described, it should be readily apparent that a wide variety of content items are contemplated, such as music, videos, manually-created images, and so on.

A conflict is resolved regarding a plurality of requests to initiate a control function (block 210). As previously described, in an implementation display of content in the user interface 302 is controllable via both the first user interface 302 and the second user interface 304. Accordingly, instances may be encountered in which control functions initiated by both clients 102, 104 conflict, one with another. For example, client 102 may interact with user interface 302 and select the dog 510 content item to be output. Client 104, however, may interact with user interface 304 and select the clock 516 content item to be output. Accordingly, the content-sharing modules 124, 126 of FIG. 1 may resolve the conflict, such as to output a most-recently selected content item as previously described in relation to FIG. 1.

A status is displayed of a file transfer of another content item from the second client to the first client in the first user interface using a representation of the other content item (block 212). FIG. 6 is a system 600 depicting the user interfaces 302, 304 of FIG. 5 as transferring the dog 512 content item from the second client 104 to the first client 102. To display the status in the illustrated example, the thumbnail representation of the dog 510 content item is "colored in" in proportion to an amount (e.g., percentage) of the dog 510 content item that is currently transferred.

Figure 7:
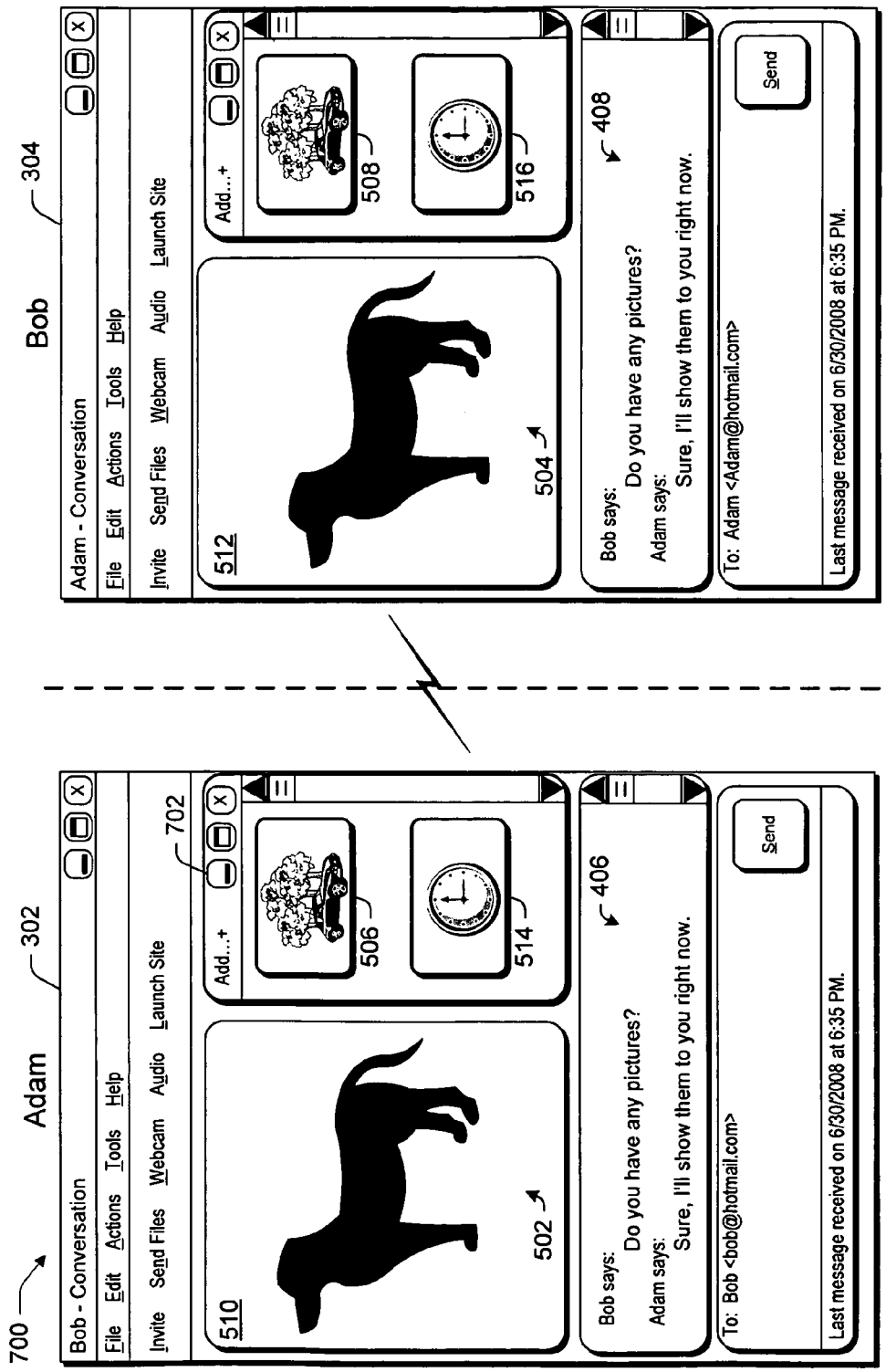
FIG. 7 is an illustration of an example system showing display of the content item transferred in FIG. 6.

When the content item is transferred, it may be displayed in "full view", an example of which is shown in a system 700 of FIG. 7. In the system 700, the dog 510, 512 content items replace the car 506, 508 in the user interfaces 302, 304 in a synchronized manner such that the output matches. In other words, the dog 512 content item is not displayed in the user interface 304 of Bob until the content item is transferred to Adam and ready for display in the user interface 302. A variety of other techniques are also contemplated for indicating a status of a transfer using a representation of a content item, such as shading, intensity, resolution, manipulation of borders, and so on.

An option is displayed that is selected to cause a reduction in an amount of display area consumed by a conversation portion and an increase in an amount of display area consumed by a content-sharing portion (block 214). For example, the user interface 302 of FIG. 7, and more particularly the content-sharing portion 502, includes an option 702 that is selectable (e.g., by a cursor-control device) to minimize the content-sharing area 502 and expand the conversation area 406, an example of which is shown in FIG. 8.

Figure 8:
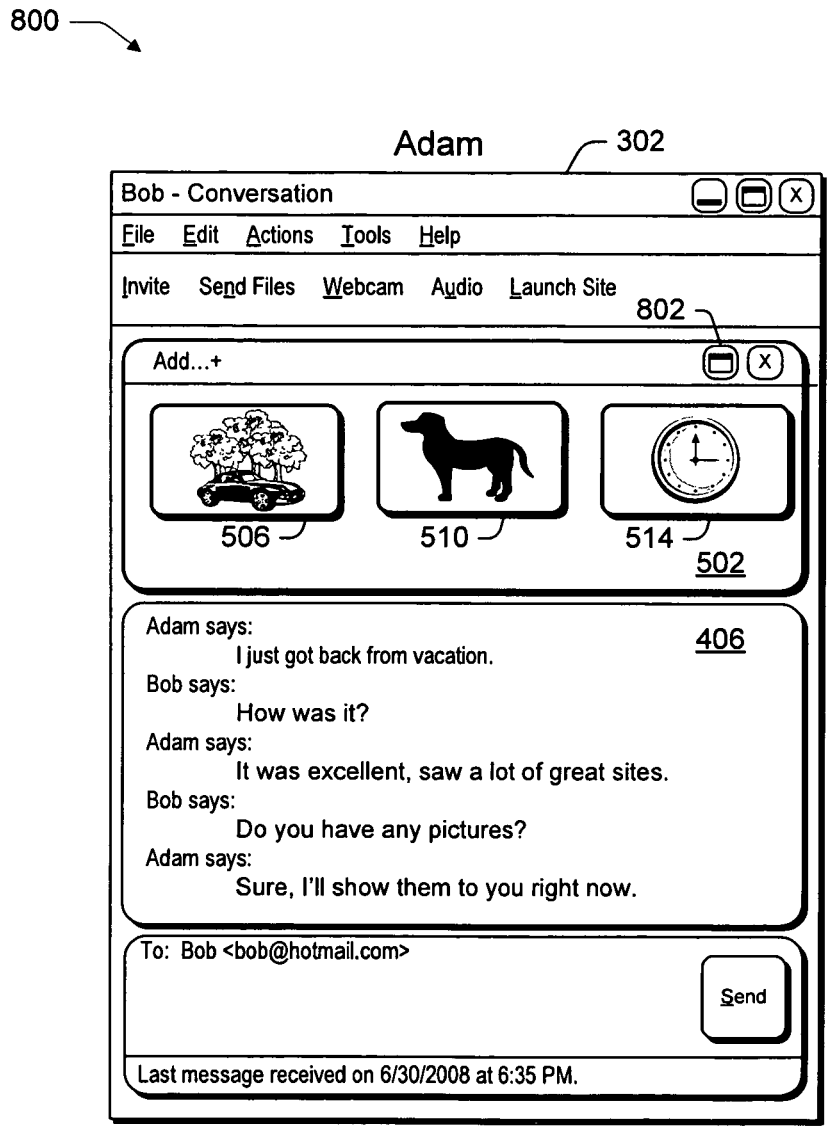
FIG. 8 is an illustration of the first user interface of FIG. 7 in which an amount of display area consumed by the conversation area in FIG. 7 is increased and an amount of display area consumed by the content-sharing area is reduced in response to selection of an option.

FIG. 8 depicts a system 800 in an example implementation in which the content-sharing area 502 is minimized and the conversation area 406 expanded in response to selection of the option 702 in the user interface 302 of FIG. 7. In this example, the car 506, dog 510 and clock 514 content items are displayed as thumbnail representations. In an implementation, selection of the option 702 causes the matching (e.g., synchronization) of the display of the content items between the user interfaces 302, 304 to suspend. In another implementation, however, both content-sharing areas 502, 504 of both user interfaces 302, 304 may be minimized in response to selection of the option through either the first or second user interfaces 302, 304.

The user interface 302 of FIG. 8 also includes another option 802 that is selectable to remove the reduction in the amount of display area consumed by the conversation portion and remove the reduction in the amount of display area consumed by the content-display portion (block 216). For example, selection of the other option 802 may cause the user interface 302 to return to a state previously shown in FIG. 7. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
displaying one or more content items in a first user interface, the first user interface associated with a first computing device, that is configured to provide instant messaging with a second user interface, the second user interface associated with a second computing device, the first user interface having:
a content-sharing portion to display the one or more content items, the content-sharing portion configured to:
display the one or more content items in the first user interface to be controllable via both the first interface and the second user interface without passing control between the first and second user interfaces;
enable display of the one or more content items in the second user interface; and
delay display of the one or more content items in the first user interface until the one or more content items are ready for display in the second user interface; and
a conversation portion to display the instant messaging; and
displaying an option that is selectable to cause an increase in an amount of display area consumed by the conversation portion and a decrease in an amount of display area consumed by the content-sharing portion such that the content-sharing portion and the conversation portion are concurrently displayed,
the displaying the one or more content items in a first user interface and enabling display of the one or more content items in the second user interface comprises displaying the one or more content items in the first user interface and enabling display of the one or more content items in the second user interface without utilizing a messaging provider associated with a third computing device to communicate messages.

2. A method as described in claim 1, further comprising displaying a status of a file transfer of the one or more content items from the second client to the first client in the first user interface using a representation of the one or more content items.

3. A method as described in claim 1, further comprising after the option has been selected cause the increase in the amount of display area consumed by the conversation portion and the reduction in the amount of display area consumed by the content-sharing area, displaying another option to remove the increase in the amount of display area consumed by the conversation area and to remove the decrease in the amount of display area consumed by the content-sharing area.

4. A method as described in claim 1, further comprising enabling a receiver of the one or more content items to prioritize transfer of the one or more content items between the first and second user interfaces.

5. Computer-readable storage memory comprising computer-readable instructions which, responsive to execution by at least one computer, are configured to:
display one or more content items in a first user interface, the first user interface associated with a first computing device, that is configured to provide instant messaging with a second user interface, the second user interface associated with a second computing device, the first user interface having:
a content-sharing portion to display the one or more content items, the content-sharing portion configured to:
display the one or more content items in the first user interface to be controllable via both the first interface and the second user interface without passing control between the first and second user interfaces; and
enable display of the one or more content items in the second user interface; and
a conversation portion to display the instant messaging;
transfer one or more content items to the second computing device for display, display of said transferred one or more content items on the first computing device is delayed until the second computing device is ready to display said transferred one or more content items; and display an option that is selectable to cause an increase in an amount of display area consumed by the conversation portion and a decrease in an amount of display area consumed by the content-sharing portion such that the content-sharing portion and the conversation portion are concurrently displayed, the computer-readable instructions to display the one or more content items in a first user interface and enable display of the one or more content items in the second user interface are further configured to display the one or more content items in the first user interface and enable display of the one or more content items in the second user interface without utilizing a messaging provider associated with a third computing device.

6. The computer-readable storage memory as recited in claim 5, the computer-readable instructions further configured to: display a status of a file transfer of the one or more content items from the second client to the first client in the first user interface using a representation of the one or more content items.

7. The computer-readable storage memory as recited in claim 5, the computer-readable instructions further configured to, responsive to selection of the option to the increase in the amount of display area consumed by the conversation portion and the reduction in the amount of display area consumed by the content-sharing area, display another option to remove the increase in the amount of display area consumed by the conversation area and to remove the decrease in the amount of display area consumed by the content-sharing area.

8. The computer-readable storage memory as recited in claim 5, the computer-readable instructions further configured to enable a receiver of the one or more content items to prioritize transfer of the one or more content items between the first and second user interfaces.

9. A system comprising:
at least one processor;
computer-readable storage memory embodying computer-readable instructions which, responsive to execution by the at least one processor, are configured to:
display one or more content items in a first user interface, the first user interface associated with a first computing device, that is configured to provide instant messaging with a second user interface, the second user interface associated with a second computing device, the first user interface having:
a content-sharing portion to display the one or more content items, the content-sharing portion configured to:
display the one or more content items in the first user interface to be controllable via both the first interface and the second user interface without passing control between the first and second user interfaces; and
enable display of the one or more content items in the second user interface;
delay display of the one or more content items in the first user interface until the one or more content items are ready for display in the second user interface; and
a conversation portion to display the instant messaging;
synchronize display of the one or more content items in the first user interface and the second user interface, including a resize of content of the one or more content items a crop of content of the one or more content items, and a minimization of content of the one or more content; and
display an option that is selectable to cause an increase in an amount of display area consumed by the conversation portion and a decrease in an amount of display area consumed by the content-sharing portion such that the content-sharing portion and the conversation portion are concurrently displayed, the computer-readable instructions to display the one or more content items in a first user interface and enable display of the one or more content items in the second user interface are further configured to display and control the one or more content items in the first user interface and enable display and control of the one or more content items in the second user interface without utilizing a messaging provider associated with a third computing device to enable the display and control.

10. The system as recited in claim 9, the computer-readable instructions are further configured to display a status of a file transfer of the one or more content items from the second client to the first client in the first user interface using a representation of the one or more content items.

11. The system as recited in claim 9, the computer-readable instructions further configured to, responsive to selection of the option to the increase in the amount of display area consumed by the conversation portion and the reduction in the amount of display area consumed by the content-sharing area, display another option to remove the increase in the amount of display area consumed by the conversation area and to remove the decrease in the amount of display area consumed by the content-sharing area.

12. The system as recited in claim 9, the computer-readable instructions further configured to enable a receiver of the one or more content items to prioritize transfer of the one or more content items between the first and second user interfaces.

* * * * *